United States Patent
Barcia et al.

(10) Patent No.: US 7,464,121 B2
(45) Date of Patent: Dec. 9, 2008

(54) APPARATUS FOR SENDING A SEQUENCE OF ASYNCHRONOUS MESSAGES TO THE SAME MEMBER OF A CLUSTERED CONSUMER

(75) Inventors: Roland Barcia, Leonia, NJ (US); Kulvir S. Bhogal, Fort Worth, TX (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 11/327,549

(22) Filed: Jan. 6, 2006

(65) Prior Publication Data

US 2007/0162457 A1    Jul. 12, 2007

(51) Int. Cl.
    *G06F 12/00* (2006.01)
(52) U.S. Cl. ............................ 707/203; 707/200
(58) Field of Classification Search .................. 707/1–2, 707/6, 9–10, 200, 203
    See application file for complete search history.

(56) References Cited

U.S. PATENT DOCUMENTS

| | | | |
|---|---|---|---|
| 4,802,220 A | 1/1989 | Marker, Jr. | |
| 4,897,854 A | 1/1990 | Harris et al. | |
| 5,392,071 A | 2/1995 | Richards et al. | |
| 5,495,606 A | 2/1996 | Borden et al. | |
| 5,708,781 A | 1/1998 | Chiashi et al. | |
| 5,867,651 A | 2/1999 | Dan et al. | |
| 6,226,623 B1 * | 5/2001 | Schein et al. | ............... 705/35 |
| 6,401,129 B1 | 6/2002 | Lenander | |
| 6,453,372 B1 | 9/2002 | Mizunuma et al. | |
| 6,628,615 B1 | 9/2003 | Joseph et al. | |
| 6,745,231 B1 | 6/2004 | Megiddo | |
| 6,952,728 B1 * | 10/2005 | Alles et al. | ............... 709/224 |
| 2002/0161889 A1 * | 10/2002 | Gamache et al. | ............ 709/226 |
| 2003/0035424 A1 * | 2/2003 | Abdollahi et al. | ........... 370/392 |
| 2003/0149792 A1 | 8/2003 | Goldstein | |
| 2004/0103196 A1 | 5/2004 | Block et al. | |
| 2006/0090095 A1 * | 4/2006 | Massa et al. | ................. 714/4 |

* cited by examiner

*Primary Examiner*—Don Wong
*Assistant Examiner*—Linh Black
(74) *Attorney, Agent, or Firm*—Martin J. McKinley; Dillon & Yudell LLP

(57) ABSTRACT

A method and system for providing advanced messaging middleware functionality that is capable of handling message groups. Advanced messaging middleware (AMM) utility responds to the receipt of members of a message group by forwarding the message groups to a single consumer application of a multiple-consumer cluster application. Group messages comprise group identification (ID), and the AMM utility binds the group ID to a single consumer application. All subsequent messages of the message group are forwarded to that particular consumer application, while other messages are forwarded to other consumer applications within the application cluster. When the message group includes a number (group count) field indicating the number of messages within the message group, an aggregator component stores all members of a message group before forwarding the collected members in one sequence to the single consumer application.

8 Claims, 15 Drawing Sheets

APPARATUS FOR SENDING A SEQUENCE OF ASYNCHRONOUS MESSAGES TO THE SAME MEMBER OF A CLUSTERED CONSUMER

BACKGROUND OF THE INVENTION

The present invention relates in general to the field of computers and similar technologies, and in particular to software utilized in this field.

In distributed computing networks, messages are frequently transmitted in groups from a sending application (originating consumer) to a receiving application (end consumer) via some form of messaging middleware application. Applications send message groups for various reasons, including for example, limitations in the size of a communication channel and workflow scenarios where messages are generated by user events in one sequence.

When a middleware application receives a message group, the messages within the group should are intended to be (or should ideally be) processed as a group and forwarded as a group to the end consumer. However, conventional messaging middleware clusters are not designed to handle message groups and have no way of recognizing and or supporting such message groups. Rather, conventional middleware clusters view each part of a message group as an individual message and routes each message individually to the next available queue, perhaps by utilizing some load balancing mechanism.

Receiving consumer applications are often represented as an application cluster with multiple versions of the same listener. Each listener is then associated with a particular consuming application of multiple consuming applications within the cluster. Conventionally, messages that are meant to be processed together are often inadvertently sent to different consumer applications of an application cluster.

Thus, it is generally not possible to reorganize a message group at a receiving consumer application with conventional messaging middleware applications. This is even more difficult when the messages are transmitted via different channels to the messaging middleware and arrive at the middleware out of sequence (and at different times) relative to other members of the group. Further, with cluster applications comprising multiple consumer applications, the messaging middleware arbitrarily forwards the different members of the message group to different ones of the consumer applications, even when the message group is designed to be handled by a single consumer.

SUMMARY OF THE INVENTION

The present invention includes, but is not limited to, a method and system for identifying a received message as a member of a message group, dynamically selecting a single destination consumer application from among multiple possible destination consumer applications within a cluster application to which messages may be forwarded, and automatically forwarding each member of the message group to the single destination consumer application selected.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

As further described below, the present invention includes, but is not limited to, a method, apparatus and computer-usable medium for a method, apparatus and computer-usable medium for providing advanced messaging middleware functionality that is capable of handling message groups. A middleware facility is enhanced with advanced messaging middleware (AMM) utility that responds to the receipt of members of a message group by forwarding the message groups to a single consumer application of a multiple-consumer cluster application. In a first embodiment, group messages comprise a header that includes a group identification (ID) field. The AMM utility parses the header and binds the group ID to a single consumer application. All subsequent messages of the message group are forwarded to that particular consumer application, while other messages are forwarded to other consumer applications within the application cluster.

In a second embodiment, the message header also includes a number (group count) field indicating the number of messages within the message group, and a sequence field that identifies the correct sequence of the particular member within the group. The AMM utility provides an aggregator component that collects and stores all members of a message group in temporary storage. Following, when all group members have been received, the AMM utility selects a single consumer application of the application cluster and forwards the collected members of the message group in a correct sequence order to the single consumer application.

As provided by the invention, the messages are asynchronous, related messages in a queuing system and not component parts of a single message. Also, the destination consumer application is provided as a cluster application, having multiple copies of itself running to enable high availability. The multiple copies may or may not be executing on the same machine. Finally, the messages may be required to be received and/or processed in some sequential order at the single machine.

For simplicity of presentation, the second embodiment is described first and references FIGS. 1B, 2B and 3A-3C. The first embodiment is then described, referencing FIGS. 8A-8B. All other figures apply to both embodiments and certain features of each embodiment may be shared with (or applied to) the other embodiment.

Figure 1A:
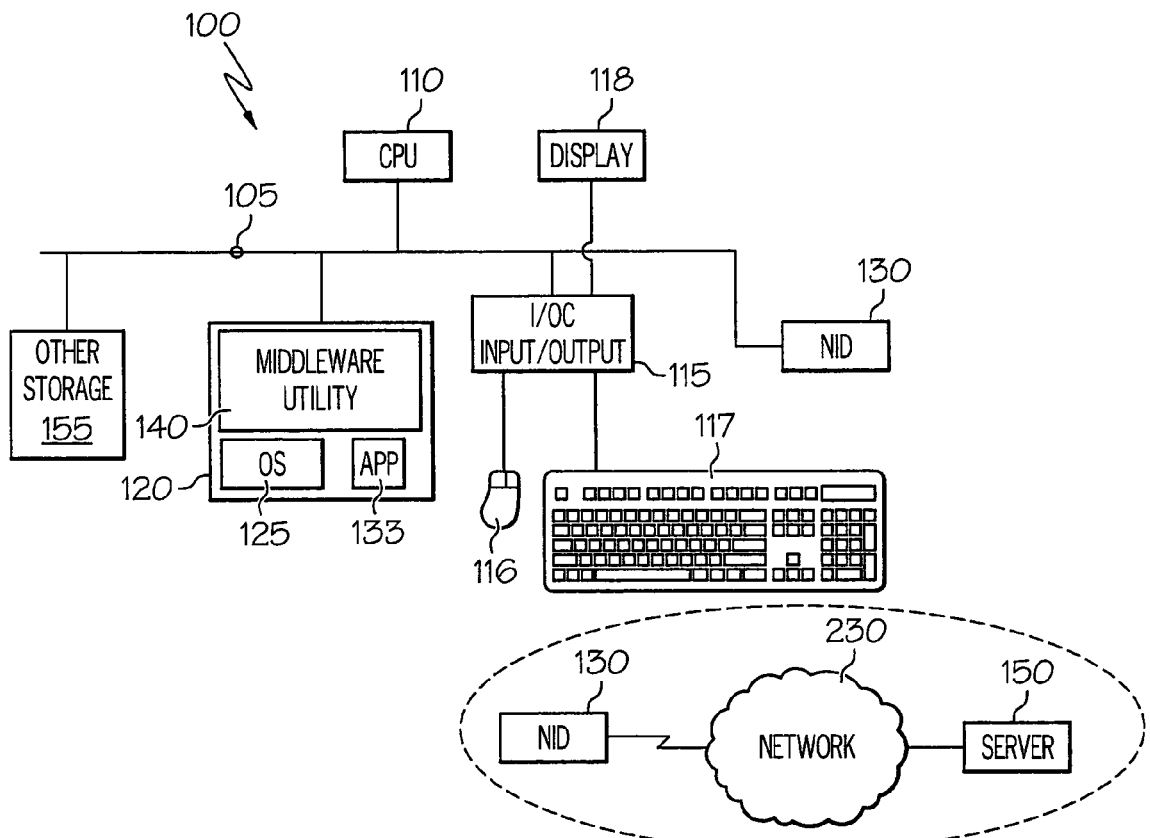
FIG. 1A is a block diagram illustrating an exemplary data processing system within which the enhanced messaging middleware features and functions of the invention may be advantageously implemented.

With reference now to the figures, and in particular to FIG. 1A, there is depicted a computer system within which features of the invention may advantageously be implemented. Computer system 100 comprises processor 110 coupled to memory 120, input/output (I/O) controller 115, and other/secondary storage 155 via a system bus 105. I/O controller 115 provides the connectivity to and/or control over input/output devices, including mouse 116, keyboard 117 and display device 118.

Computer system 100 also comprises a network interface device 130 utilized to connect computer system 100 to another computer system and/or computer network (as illustrated by inset to FIG. 1A). NID 130 provides interconnectivity to an external network through a gateway or router, or similar device. NID 130 may be an Ethernet card or modem, for example, depending on the type of network (e.g., local area network (LAN) or wide are network (WAN)) to which the computer system 100 is connected.

Figure 1B:
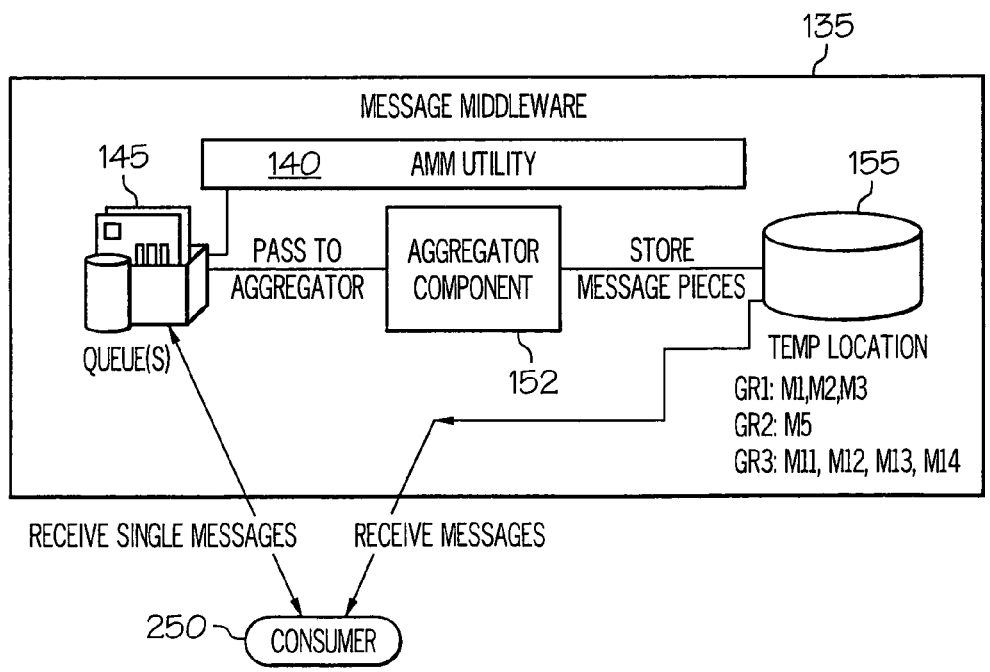
FIG. 1B is a block diagram illustrating component parts of messaging middleware which may be implemented with particular hardware and software elements of FIG. 1A according to one embodiment of the invention.

Located within memory 120 and executed on processor 110 are a number of software components, including operating system (OS) 125 and a plurality of software applications, including App 133 and advanced messaging middleware (AMM) utility 140. Processor 110 executes various application programs (e.g., network connectivity programs, and middleware utility 140, among others), as well as the OS (e.g., Microsoft Windows®, a trademark of Microsoft Corp) that supports the application programs. According to the illustrative embodiment, OS 125, applications 133 (namely network access applications/utilities), and AMM utility 140 execute on processor 110 and provide/enable general messaging middleware functions as well as enhanced grouping middleware features/functionality utilizing certain hardware and firmware devices that collectively comprise messaging middleware facility, as illustrated by FIG. 1B. The transmission of group messages is illustrated by the network diagram of FIG. 2A and overall system diagram of FIG. 8A, which are described below.

In one embodiment, the hardware components of computer system 100 are of conventional design. Computer system 100 may also include other components (not shown) such as fixed disk drives, removable disk drives, CD and/or DVD drives, audio components, modems, network interface components, and the like. It will therefore be appreciated that the system described herein is illustrative and that variations and modifications are possible. Further, the techniques for messaging middleware functionality may also be implemented in a variety of differently-configured computer systems. Thus, while the invention is describe as being implemented in a computer system 100, those skilled in the art appreciate that various different configurations of computer systems exists and that the features of the invention are applicable regardless of the actual configuration of the computer system.

Notably, in one embodiment, computer system 100 may be utilized to also provide the functions of a consuming application, in which implementation computer system 100 also comprises the software that implements the consuming application functions. Further, the invention is applicable to not only a desktop-type or laptop computer system but may also be implemented in a portable and/or hand held device such as a personal digital assistant (PDA), cell phone, or other handheld devices, as well as within larger mainframe type devices so long as the device has a processor and storage, network access, and performs functions similar to those of advanced messaging middleware (AMM) utility 140.

FIG. 1B provides a view of the components of messaging middleware facility 135, which necessarily comprises AMM utility 140. In addition to AMM utility 140, middleware facility 135 comprises queue(s) 145, aggregator component 152, and temporary storage location (other storage) 155. Specific use of each component will be made clear within the description below. Notably, storage location 155 is shown with three groups of messages (GR1, GR2, and GR3) having particular ones of received messages from an originating consumer application. These groups are being compiled/grouped before being sent to a receiving consumer application 250 (via the listener associated therewith). When executed by processor 110, AMM utility 140 implements the general middleware program functions, and along with aggregator component 152 performs the functions provided by the described invention. Within the first embodiment, these functions include: (1) aggregating received group messages in temporary storage; (2) selecting a single consumer application to assign to the message group; and (3) forwarding the stored message groups to the single consuming application; and (4) blocking access to the consumer application until all messages within the message group has been forwarded, as described below, with reference to FIGS. 3A-3C.

Thus, key functionality of the invention is provided by AMM utility 140, which operates on received messages according to the processing provided by the flow charts described below. The invention generally provides a method, system and computer program product that enables the messaging middleware (operating within a highly available message topology) to provide support for clustering by the messaging system via clustering queues as well as clustering of message groups for forwarding to a consuming application. In one implementation of the invention, the AMM utility 140 also prevents other messages that arrive during forwarding of a message group from disrupting the flow of the message group to the intended receiving consumer application.

Figure 2A:
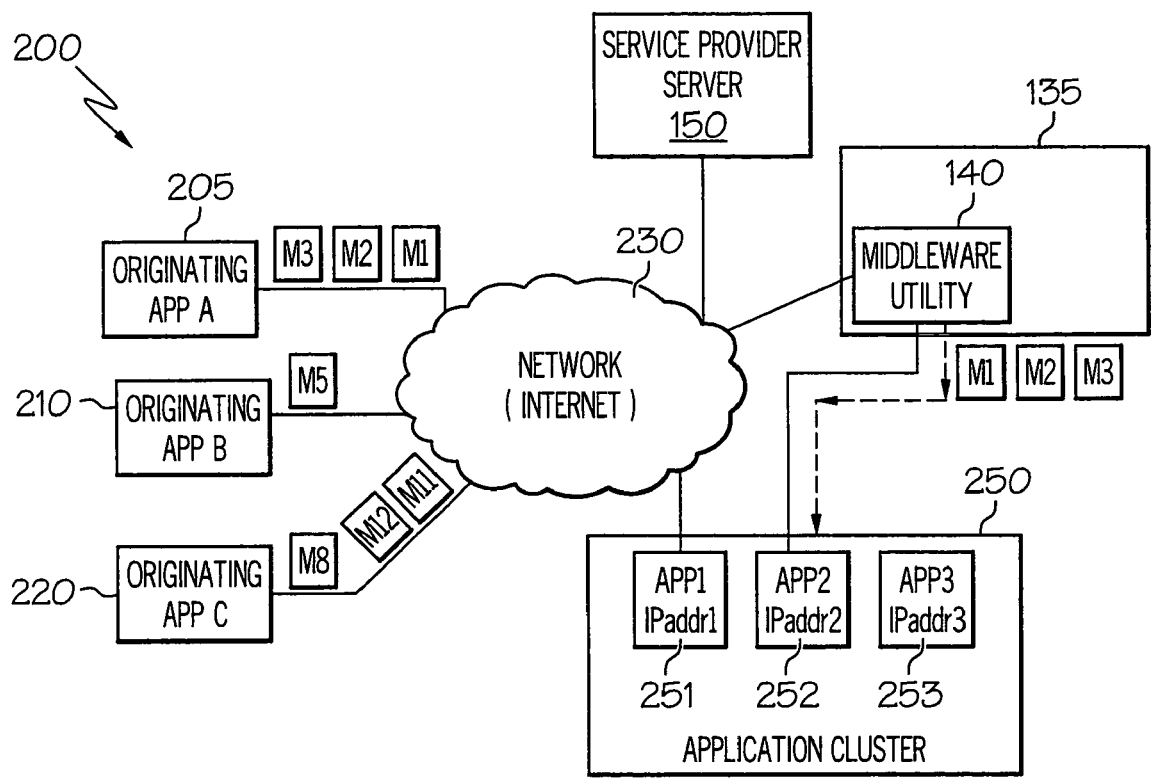
FIG. 2A is a network diagram illustrating the network environment within which advanced messaging middleware of FIGS. 1A-1B is implemented, in accordance with one embodiment of the invention.

Temporary Storage of Message Group Before Forwarding to Selected Consumer Application With reference now to FIG. 2A, there is illustrated an example messaging network environment within which features of the invention may be advantageously implemented. Network 200 comprises a network backbone 230 illustrated as a network cloud. According to the described embodiments, network 200 may be an Internet Protocol (IP) network (or Internet, for short) that transmits data packets (or messages) utilizing Transmission Control Protocol (TCP). Connected to network backbone 230 (via routers or gateways, not shown) are a plurality of originating consumer applications, of which originating consumer application A 205, consumer application B 210, and consumer application C 220 are illustrated. Originating consumer applications may be any application that generates either group messages or both single messages and group messages that are routed to a receiving consumer application (application cluster) 250 via messaging middleware facility 135, which includes AMM utility 140.

According to the illustrative embodiment, messages are routed from middleware facility 135 to application cluster 250, which includes therein three receiving consumer applications, App1 251, App2 252, and App3 253. Each receiving consumer application registers a listener function at middleware facility 135, and each listener (i.e., agent of the application) may have associated therewith a unique network routing address, which in the illustration is assumed to be an IP address, identified as IPaddr1, IPaddr2 and IPaddr3, respectively.

For illustration, each originating application is shown issuing a single message or group of messages, with messages sequentially numbered M1-M12 for illustration. Messages M1-M3 are provided as Group1 messages, routed generally to the consumer application cluster 250. Message M5 is a single message (i.e., not grouped), while messages M11-M13 are also a group (Group2 messages) routed generally to the consumer application cluster 250. Notably, these messages of the message group each include a message header in which the group identifier (ID) and other relevant parameters are provided.

Figure 2B:
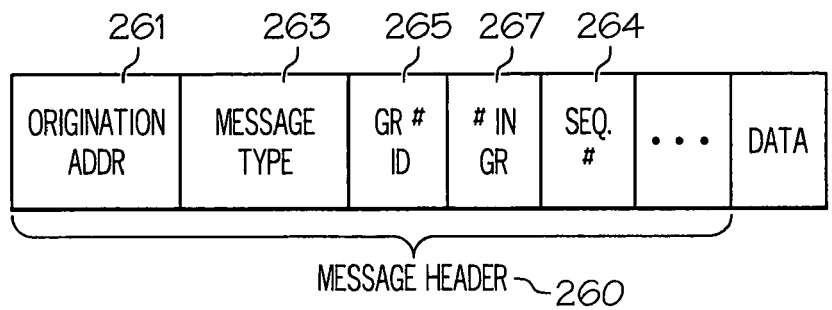
FIG. 2B is a block diagram representation of the header of a group message having a group ID and other features according to one embodiment of the invention.

An exemplary message header illustrating a subset of the relevant header components (for the first embodiment) is illustrated by FIG. 2B. Header 260 comprises standard fields, of which originating address 261 and message type 263 are illustrated. When each message of a message group is generated, message header 260 also comprises additional fields (or entries) including a group identifier (groupID) 265. Additionally, with the first embodiment, message header 260 also comprises group count/number 267, which indicates the number of messages within a message group and is utilized to track when all the messages of the message group have been received. Finally, in the disclosed embodiment, message header 260 includes sequencing number 264, indicating the position of the particular message within the group sequence and utilized when the message group is to be forwarded to the consumer application in a particular order.

Each of the above fields is encoded within the message header 260. The order or presentation of fields/entries within the exemplary message header 260 is provided solely for illustration and not meant to imply any structural changes to standard configuration of a message header other than addition of the groupID, number/count, and sequencing fields required to provide the features of the invention. Thus, according to the illustrative embodiment, the implementation includes expanding the messaging protocol to enabled inclusion within the header of these additional fields. In one embodiment, existing "don't care" or additional, unutilized/unassigned bits within the header are assigned specific functions to enable the message header to provide the total number of messages in a group, the particular sequence of the message part, and a unique identifier for the group.

One implementation may involve allocating a single bit to identify if the message is a group message, where a first bit value (0) indicates a single message while a second bit value (1) indicates that the message is a group message. In an alternate embodiment, the value of the groupID field is utilized to determine whether the received message is a group message or an individual message. Assuming an implementation that supports concurrent tracking of seven groups, for example, (perhaps one for each of seven originating consumer applications), only three bits are assigned for the groupID, and the null or all zero (000) value indicates the message is a single message. Conversely, any other value of the groupID indicates that the message is assigned to a group and indicates the specific group/groupID (e.g., 1-7) to which the message is associated.

While binary (000-111) numbers are utilized to represent the groupIDs within the described embodiments, actual implementation may involve utilization of unique group IDs, indicating specific originating consumer applications and the specific processes that generate the message groups. Also, it should be noted that the messages within the message group described herein refer to complete messages and not to a single message that is broken up and is being transmitted as message pieces.

Figure 8A:
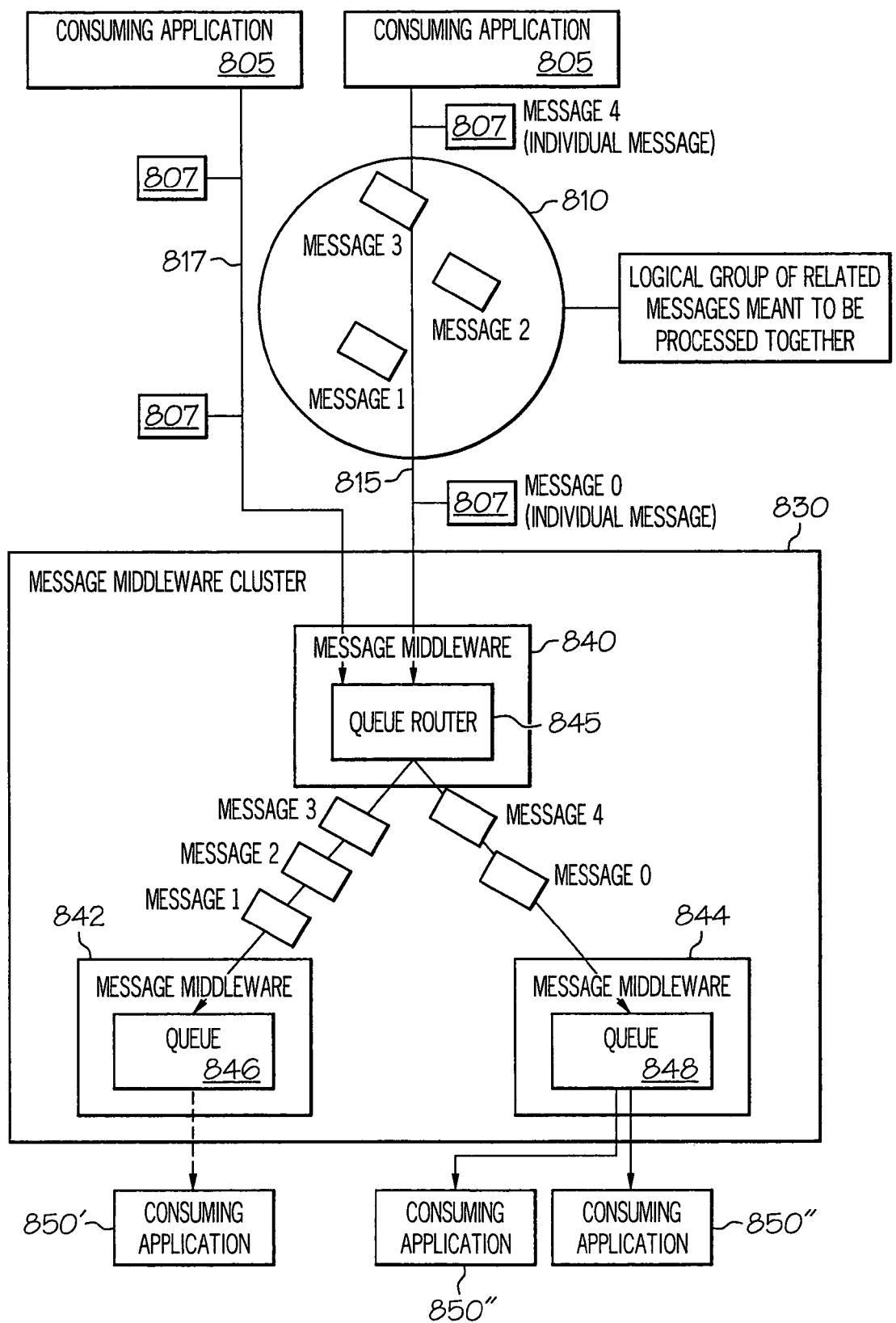
FIG. 8A illustrates a messaging environment in which a message group is routed via a single channel to the messaging middleware cluster and to a single consumer application according to one embodiment of the invention.
Figure 8B:
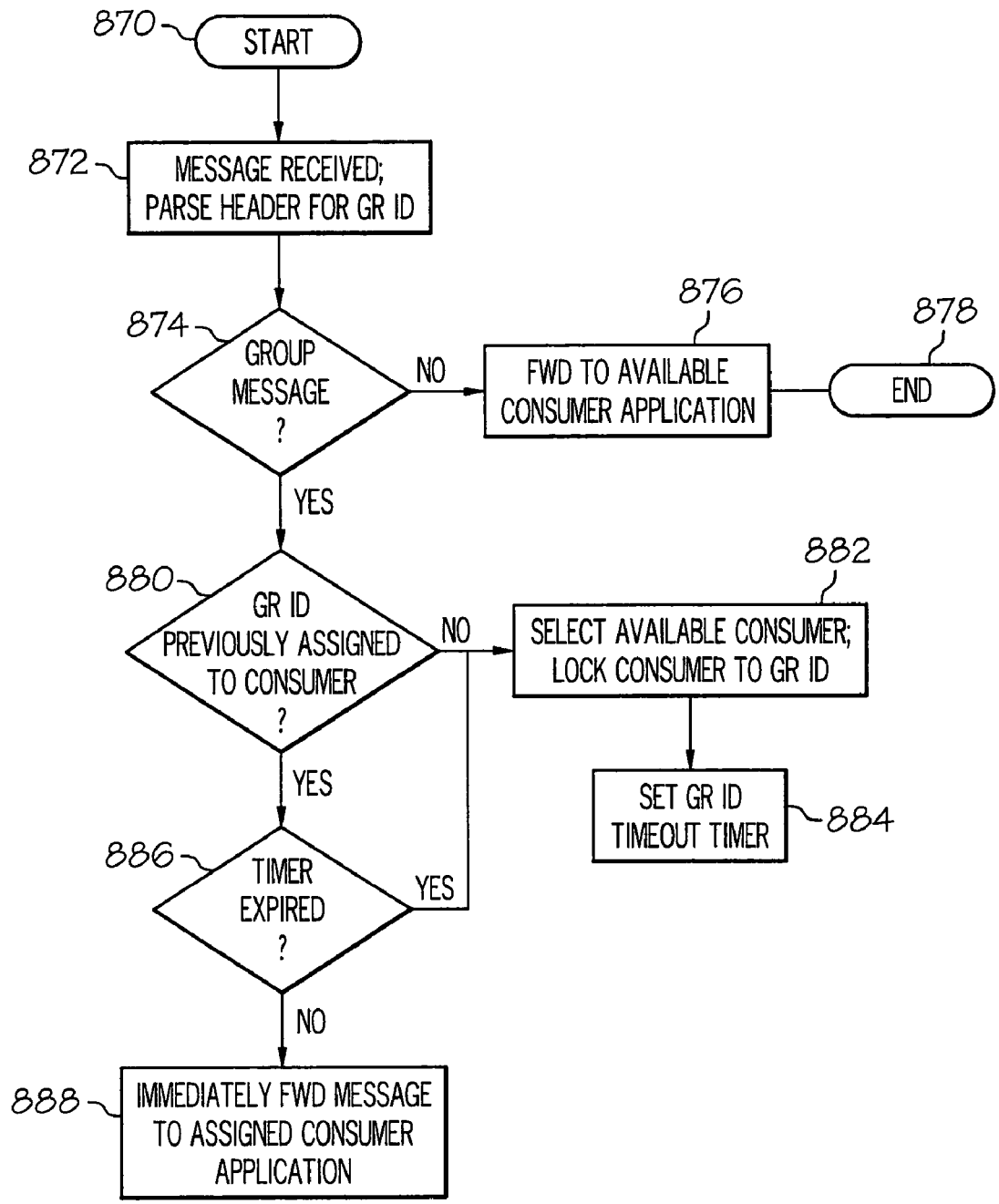
FIG. 8B is a flow chart illustrating the process of routing group messages to a single consumer application in accordance with one embodiment of the invention.

Notably, in the second embodiment, described in greater details with reference to FIGS. 8A and 8B, only the group ID 265 is required to enable the forwarding features provided by the AMM utility. That is, no group count/number is included within the messages, and the sequence number may also be omitted. Specific application of the header in this embodiment will be made clearer below.

When the message header includes a group count/number as provided above and illustrated by FIG. 2B, AMM utility 140 implements the second embodiment, which is now described. In the illustrative embodiment of the present invention (as illustrated by FIG. 1B), the message middleware facility 135 is provided a message aggregator component 152, which operates to compile/aggregate the received members of a message group in temporary storage and forward the compiled message group to the same consumer application (identified by a particular listener) once all the messages in the group are received. Further, while forwarding the group messages, the AMM utility 140 prevents other messages from being sent to that cluster member (consumer application) until all the messages within the message group have been sent to the consumer application.

Figure 3A:
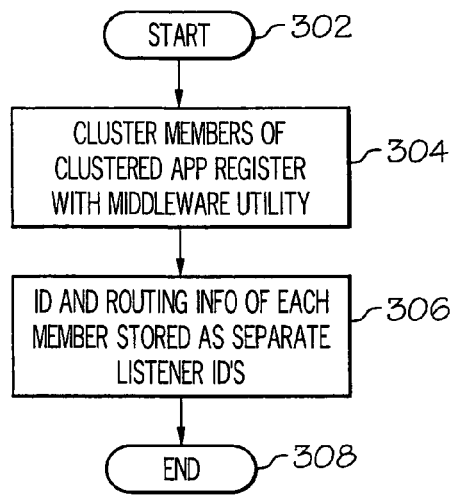
FIGS. 3A-3C illustrates various portions of the process of receiving, storing, and forwarding a group of messages being sent to a single consuming application, according to embodiments of the invention.
Figure 3B:
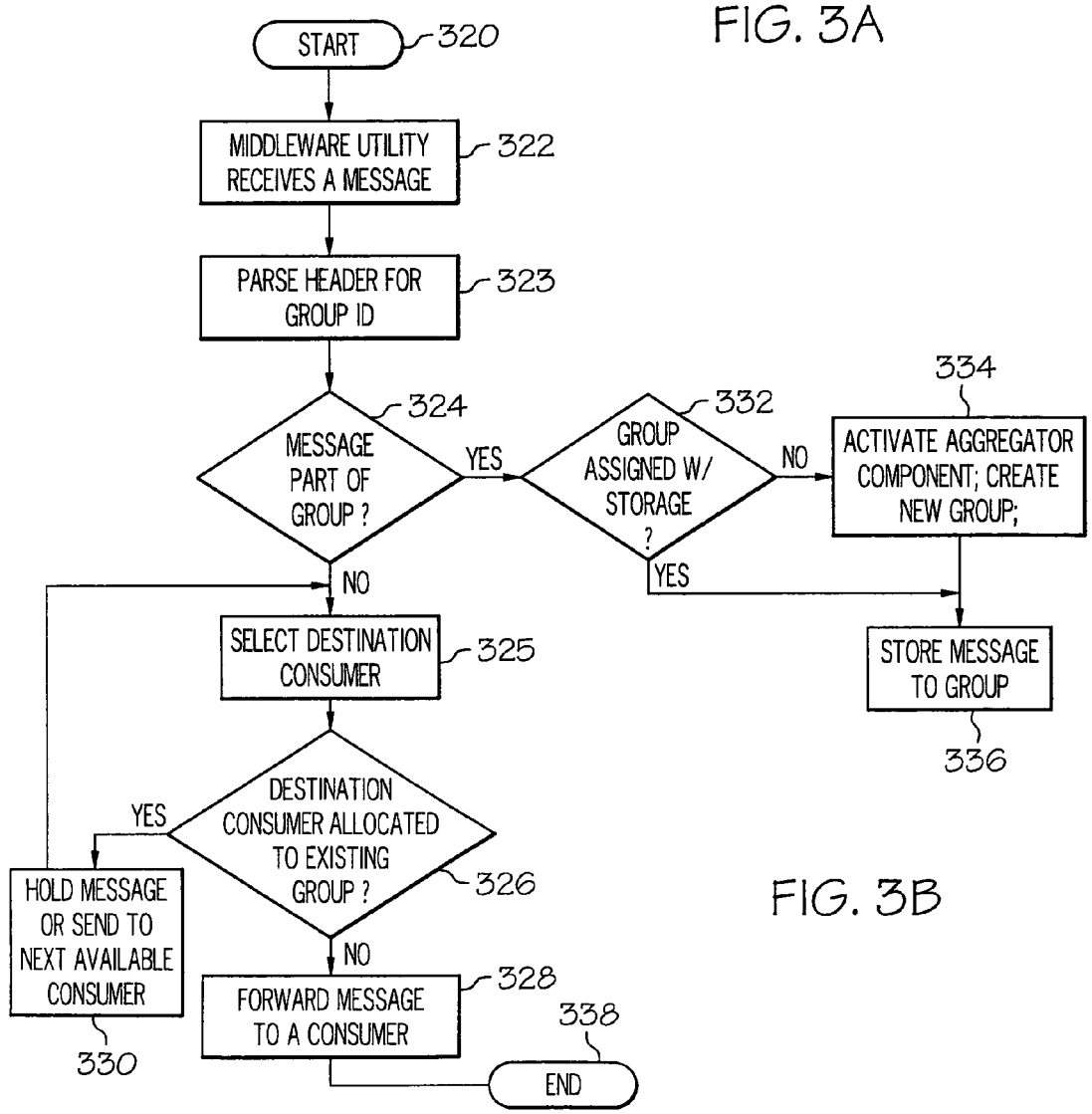
Figure 3C:
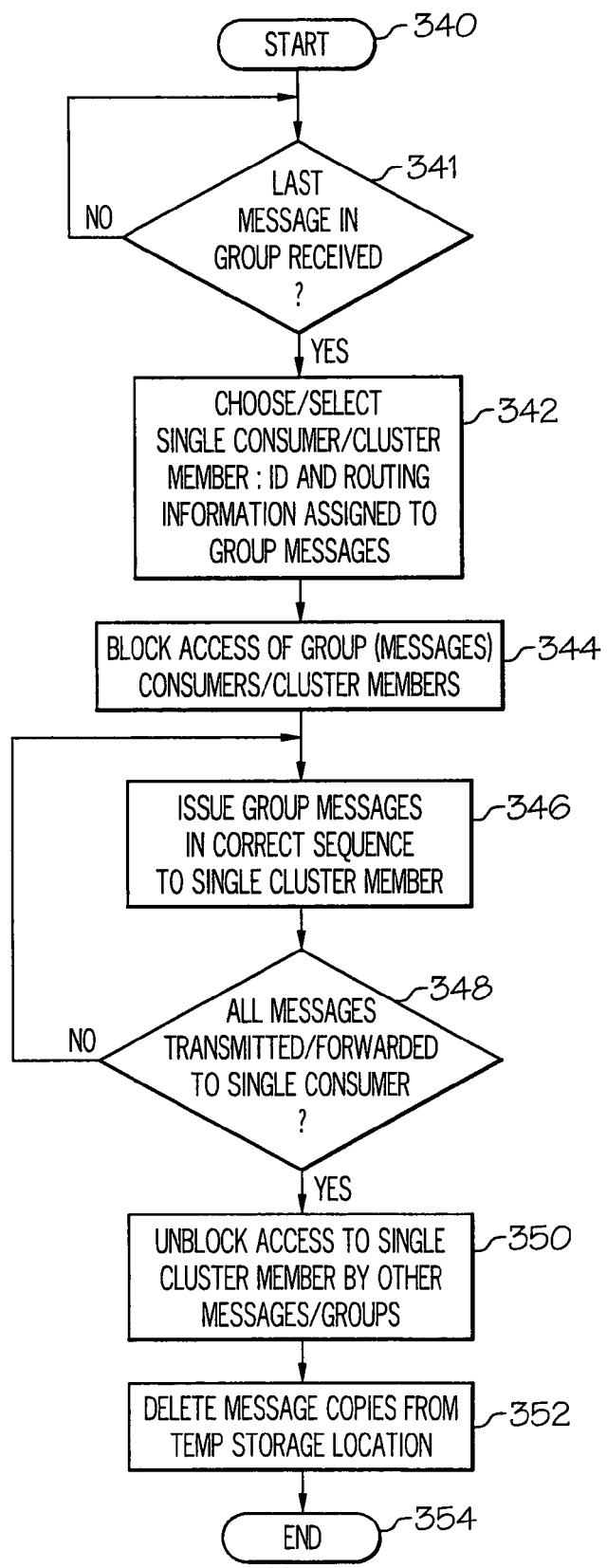

According to the illustrative embodiment, the processing of the invention may be divided into four phases, represented by the flow charts of FIGS. 3A-3C. These four phases comprise: (1) registration of the message listener with the messaging middleware facility; (2) receipt and handling by the messaging middleware facility of a first message of a message group; (3) receipt and handling of subsequent messages of the message group (i.e., not the first or the last message); and (4) receipt and handling of a last message of the message group and transfer of the message group to consumer application.

In the first phase, the clustered application registers itself with the middleware facility and provides each cluster member as a separate listener. Registration of separate listeners is necessary to distinguish which single consumer application within the clustered application the messages received by middleware facility are forwarded to. FIG. 3A illustrates the registration process. The process starts at initiation block 302 and proceeds to block 304, which illustrates receipt at the messaging middleware facility of the registration requests of the cluster members (listeners). The middleware utility stores each cluster member ID and/or IP address as a separate listener for grouping messages, as shown at block 306. Then, the process ends as indicated at termination block 308.

Phase 2 and portions of Phase 3 are illustrated by the flow chart of FIG. 3B. The process starts at initiation block 320 and proceeds to block 322 at which a message arrives at the middleware facility 135. The AMM utility 140 parses the header of the received message for a groupID, if any, as shown at block 323, and based on the value contained within the groupID field, determines at block 324 if the message is a part of a group. In one embodiment, a default/null value (e.g., all zeros) in the groupID field indicates that a received message is not a part of a group. Then, all other messages that are a part of a group contain a specific value other than the null value.

At block 324, if the message is not identified as a part of a group, i.e., a single message, then the AMM utility 140 selects a consuming application (listener) (from among the multiple consumers within the application cluster) at block 325. The AMM utility 140 next checks at block 326 whether the destination (IP) address of the consuming application matches the destination address of a consumer (listener) selected AMM utility 140 for forwarding a message group to. When the address of the selected listener does not match that of one selected to assign to any message groups currently being forwarded, the AMM utility 140 forwards the single message to the consumer application selected, as shown at block 328. Then the process ends at termination block 338. At block 326, when the selected destination address for the single message matches that of a consumer assigned to a message group, the AMM utility 140 (1) suspends forwarding the message to the selected consumer application (i.e., the message is held) until the aggregator component completes forwarding the message group to that consumer or (2) selects a next consumer application to assign the message to, as indicated at block 330.

Thus, when the AMM utility 140 blocks access to the specific consumer application assigned to receive the group messages, the other listeners continue to receive/service other messages addressed to that application cluster. Once the message pieces of the message group have been transferred to the receiving consumer application, the middleware utility opens up access to this cluster member. Additionally, in one embodiment, the middleware utility removes the message pieces from the temporary storage location of the aggregator component once the pieces have all been transferred.

Returning to block 324, when the message is identified as a part of a group, the AMM utility performs a check of stored groups within the local storage to determine (at block 332) whether local storage has already been assign to the particular group (i.e., a previous member of the group has been received and stored). When the group has not yet been assigned local storage, indicating that the message is the first message of the group, the middleware utility activates the aggregator component to allocate storage to hold the message pieces of the group until all the messages are received, as provided at block 334. Thus, the aggregator component creates a new group entry and stores the message and sequence information in the temporary storage location as shown at block 336. In one embodiment, creation of the new group storage location involves determining the size of the location to assign to the group using a number of parameters, including, for example: the number of members within the group; the size of each message component, which is known from message routing protocol; additional buffer space for placing groups in correct sequence; and storage space required for the groupID.

When another message of the group arrives, the AMM utility follows the same process of checking for group membership and the prior existence of the group. Then, if the group already exists (at block 332), the AMM utility adds the message to the group (via aggregator utility) at block 336.

FIG. 3C illustrates the continuation of the process of FIG. 3B following receipt of the last message in a group. The process begins at initiator block 340 and proceeds to decision block 341 at which the middleware utility determines whether the received message is the last/final message for an aggregating group. When the last message is received, the aggregator may add the message to the storage location to complete the group sequence. Alternatively, AMM utility 140 may be set to only store received group messages that are not the last group message for that group so that the last message is immediately forwarded followed by the other stored messages.

On receipt of the last message (based on a count of the received messages), AMM utility 140 initiates an automatic transfer of the message group from the storage location by first identifying/choosing/selecting (at block 342) a single consumer application (from among the cluster members) to which to transfer the message group. The selected consumer may be selected via any one of a number of random processes or perhaps selected based on current loading characteristics across the various cluster members. Once a consumer application is selected, all access to that consumer application by other subsequently-received messages (outside of the message group) are blocked and these other messages are routed to another consumer application, as shown at block 344. This blocking of other message(s) prevents the other message(s) from interfering with the sequential transfer of the messages within the message group. In addition, blocking allows the cluster to keep processing other messages via other listeners, thus maintaining the overall scalability of the system.

Because the messaging middleware facility 135 does not begin sending the received messages to the particular consumer application until the aggregator component 152 has received all the messages of the group, the duration in which the middleware facility 135 "holds" a particular consumer bound while forwarding the message group is relatively short (i.e., only the time required to transmit the entire message group in sequence).

Returning to the FIG. 3C, following block 344, the group members are transferred to the consumer application in a correct sequence order, as indicated at block 346. The sequence order is retrieved from within the header of each message and is utilized herein since messages of a group may arrive at the middleware facility out-of-order relative to each other. In one embodiment, the group members are ordered at the AMM utility 140 when received and placed within the storage location. The message group is then merely forwarded to the consumer application in the order in which the messages are stored. The AMM utility 140 determines at block 348 whether all messages within the group have been transferred to the consumer. Messages continue to be transferred until all the messages of the group are transferred. When all the messages have been transferred, the AMM utility unlocks/unblocks access by other messages/groups to the consumer application, as provided at block 350. Next, the AMM utility 140 deletes the copy of the messages of the transferred message group from the storage location, as shown at block 352. Then, the process ends at terminator block 354.

Direct Forwarding of Group Messages to Assigned Consumer Application

Elements of the second implementation of the invention are illustrated by FIG. 8, which is now described. FIG. 8A illustrates a messaging environment in which originating consuming applications 805 generate a sequence of messages, including single messages (0, 4) 807 and message group 810, which comprises messages numbered 1-3. All messages are transmitted to one or more receiving consumer applications 850'-850'' via messaging middleware cluster 830. As shown, messages originating at consuming application 805 may be transmitted to messaging middleware cluster 830 via separate routes 815/817. Also, for simplicity, all (single non-grouped) messages are provided a same reference numeral (807). Messaging middleware cluster 830 comprises AMM utility (not shown in this illustration), which provides several middleware applications, including primary middleware application 840 and two secondary middleware applications 842/844. Primary middleware application 840 comprises a queue router 845 which routes messages "individually" to one of two secondary queues 846/848 (based perhaps on some load balancing function at queue router 845). Each queue 846/848 supports routing of messages to respective receiving consuming applications 850'/850".

Within this second described implementation, introduced above, the group messages are not provided with a number/count of the total number of messages existing within the message group 810. The messages should, however still be treated as a group, and thus the message middleware clustering facility 830 is provided enhanced intelligence (via AMM utility 140) to directly route related group messages through the same channel (router) and also hold a consumer application for a particular message group. As shown by FIG. 8A, all group messages (1-3) are directed to message middleware 842 and ultimately to first consumer application 850', while the other non-group messages (0, 4) are blocked from going to message middleware 842 and sent via the other messaging middleware 844 to the second consumer application 850".

The first component of the implementation enables applications with sequencing needs that issue messages with group IDs to direct the messages to be sent through a same channel within the middleware cluster, rather than separate channels. In this manner a sequence of asynchronous messages are transmitted through the same channel in a messaging middleware cluster. This functionality helps to keep the group messages together (and in correct sequence), and therefore enable the messaging middleware to better handle the group of messages coming through a same transmission channel.

The second component of this implementation is illustrated by the flow chart of FIG. 8B. The process begins at initiation block 870 and proceeds to block 872 at which a message is received and the AMM utility parses its header for group ID information. A determination is made at block 874 whether the message is a group message (i.e., the message contains a group ID), and if not, the message is forwarded to any available consumer application via any open channel within the messaging cluster, as indicated at block 876. Then the process ends at termination block 878.

If, the message is a group message, a check is made at block 880 whether the group ID has been previously assigned to a consumer application. If the group ID has not been previously assigned to a particular consumer application, the AMM utility selects and available consumer application and binds the consumer application to that group ID, as shown at block 882. This binding forces any subsequent message with that group ID to be immediately forwarded to the particular consumer application. Then a timer is set for the group ID at block 884 to track a timeout condition.

When the group ID has been previously assigned to a particular consumer, the message may be immediately forwarded to that particular consumer application (by-passing block 886). However, in the illustrative embodiment, at block 886, a determination is made prior to forwarding the message whether a timer for holding the consumer application bound to the group has expired. The direct forwarding of the message then occurs when the timer has not expired (block 888). Otherwise, the AMM utility enacts a re-selection of the consumer application and re-binds the consumer application to the group ID, as shown at block 882.

The timeout condition may provide a set period of time for the entire message group to be received before releasing the consumer applicant back to general message allocation. In another embodiment, the timer may track just the time between receipt of group members, such that a next received member is expected to be received prior to the expiration of the timer. If the next member is not received before the timeout, the AMM utility may permit other messages to be sent to the particular consumer application (i.e., not block other messages that are not a part of the group). In yet another embodiment, no timer function is provided and the consumer application if linked (to perpetuity) to the particular message group ID. In this embodiment, no blocking of other messages from accessing the consumer application is provided.

While both implementations may be provided independent of each other, embodiments may be provided wherein both implementations are executed in combination with each other. For combined implementation, a single AMM utility includes both functional components that enable each of the specific implementation. AMM utility then handles received group messages in different ways depending on whether the messages contain a number/count that can be utilized to track temporary storage of the group messages. The number/count is utilized to trigger the forwarding of the message group when all the messages have been received. When there is no number/count within the messages, the AMM utility simply forwards the messages to a single application utilizing the method illustrated by FIGS. 8A-8B. Together, both embodiments provide a robust messaging middleware facility that effectively handles the receipt of message groups by routing group messages through the same channel in a messaging middleware cluster, selecting specific consumers applications within an application cluster, clustering/aggregating messages, where applicable, and forwarding all messages of the message group (aggregated or not) to the same selected consumer application.

Software Deployment

Thus, the method described herein, and in particular as shown and described in FIGS. 3A-3C and 8B can be deployed as a process-software from service provider server 150 to client computer 100.

Figure 4A:
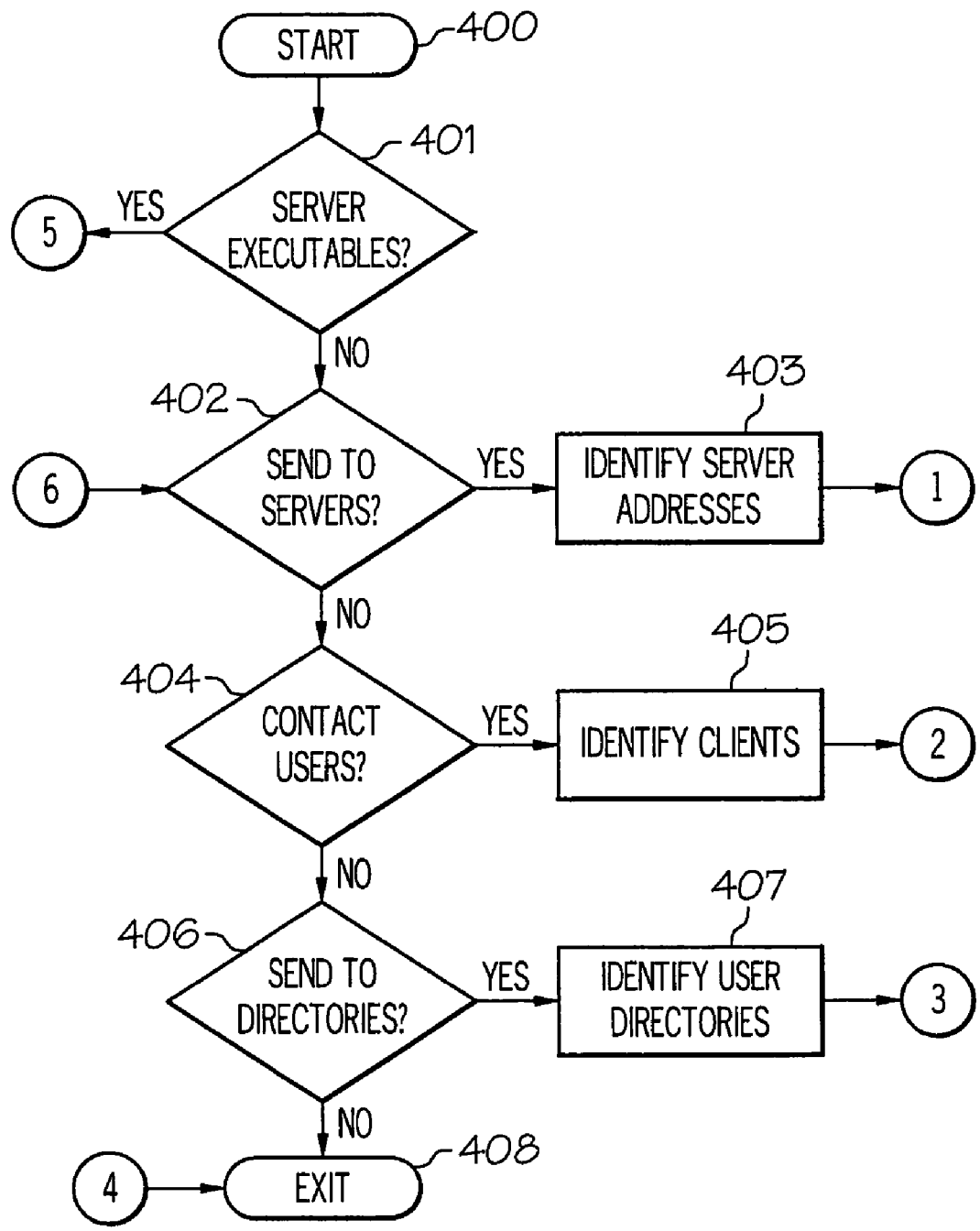
FIGS. 4A-B show a flow-chart of steps taken to deploy software capable of executing the steps shown and described in FIGS. 3A-3C.
Figure 4B:
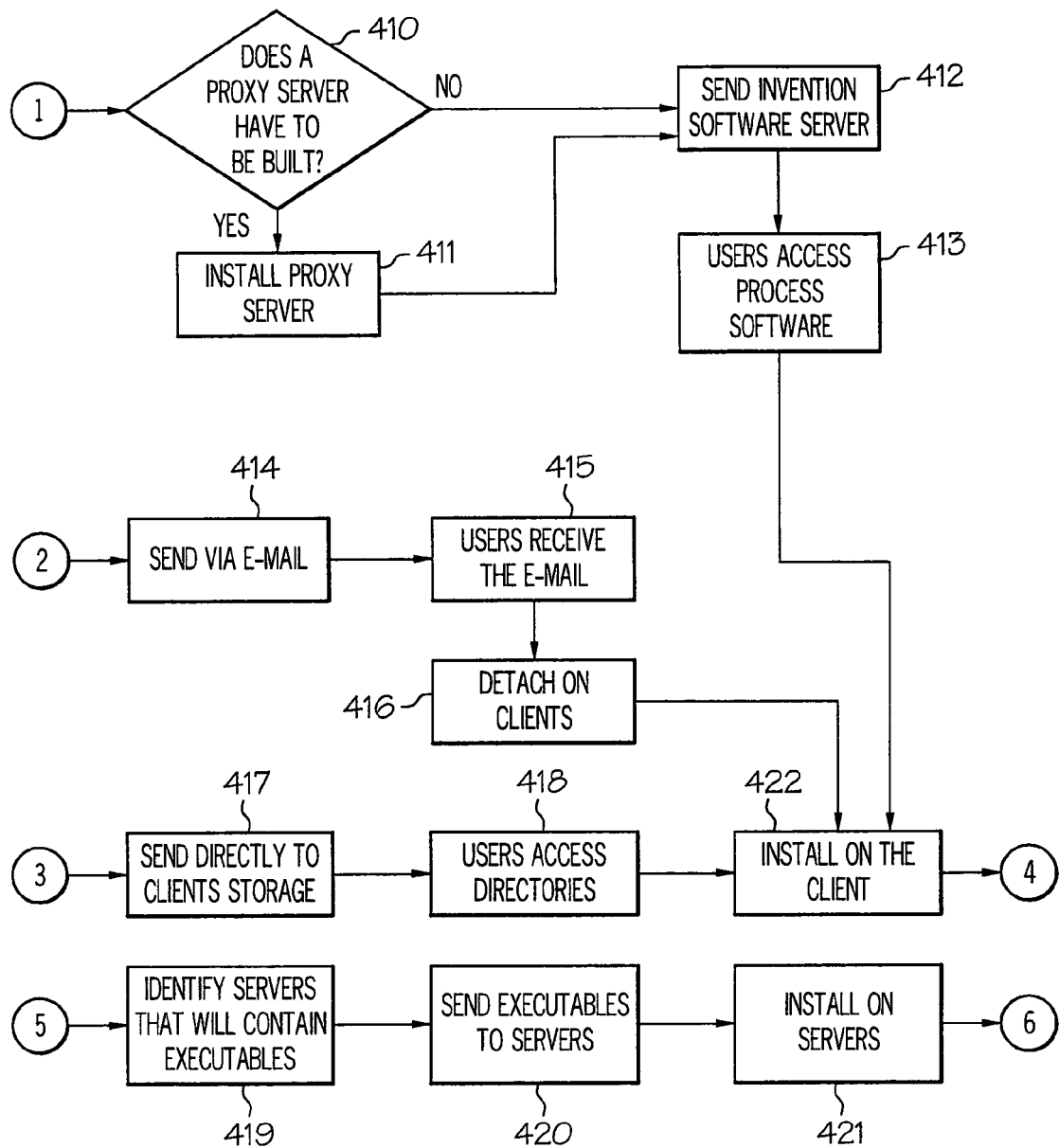

Referring then to FIG. 4, step 400 begins the deployment of the process software. The first thing is to determine if there are any programs that will reside on a server or servers when the process software is executed (query block 401). If this is the case, then the servers that will contain the executables are identified (block 419). The process software for the server or servers is transferred directly to the servers' storage via File Transfer Protocol (FTP) or some other protocol or by copying though the use of a shared file system (block 420). The process software is then installed on the servers (block 421).

Next, a determination is made on whether the process software is be deployed by having users access the process software on a server or servers (query block 402). If the users are to access the process software on servers, then the server addresses that will store the process software are identified (block 403).

A determination is made if a proxy server is to be built (query block 410) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 411). The process software is sent to the servers either via a protocol such as FTP or it is copied directly from the source files to the server files via file sharing (block 412). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 413). Another embodiment is to have the servers automatically copy the process software to each client and then run the installation program for the process software at each client computer. The user executes the program that installs the process software on his client computer (block 422) then exits the process (terminator block 408).

In query step 404, a determination is made whether the process software is to be deployed by sending the process software to users via e-mail. The set of users where the process software will be deployed are identified together with the addresses of the user client computers (block 405). The process software is sent via e-mail to each of the users' client computers (block 414). The users then receive the e-mail (block 415) and then detach the process software from the e-mail to a directory on their client computers (block 416). The user executes the program that installs the process software on his client computer (block 422) then exits the process (terminator block 408).

Lastly a determination is made on whether to the process software will be sent directly to user directories on their client computers (query block 406). If so, the user directories are identified (block 407). The process software is transferred directly to the user's client computer directory (block 417). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 418). The user executes the program that installs the process software on his client computer (block 422) and then exits the process (terminator block 408).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's-private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 5A:
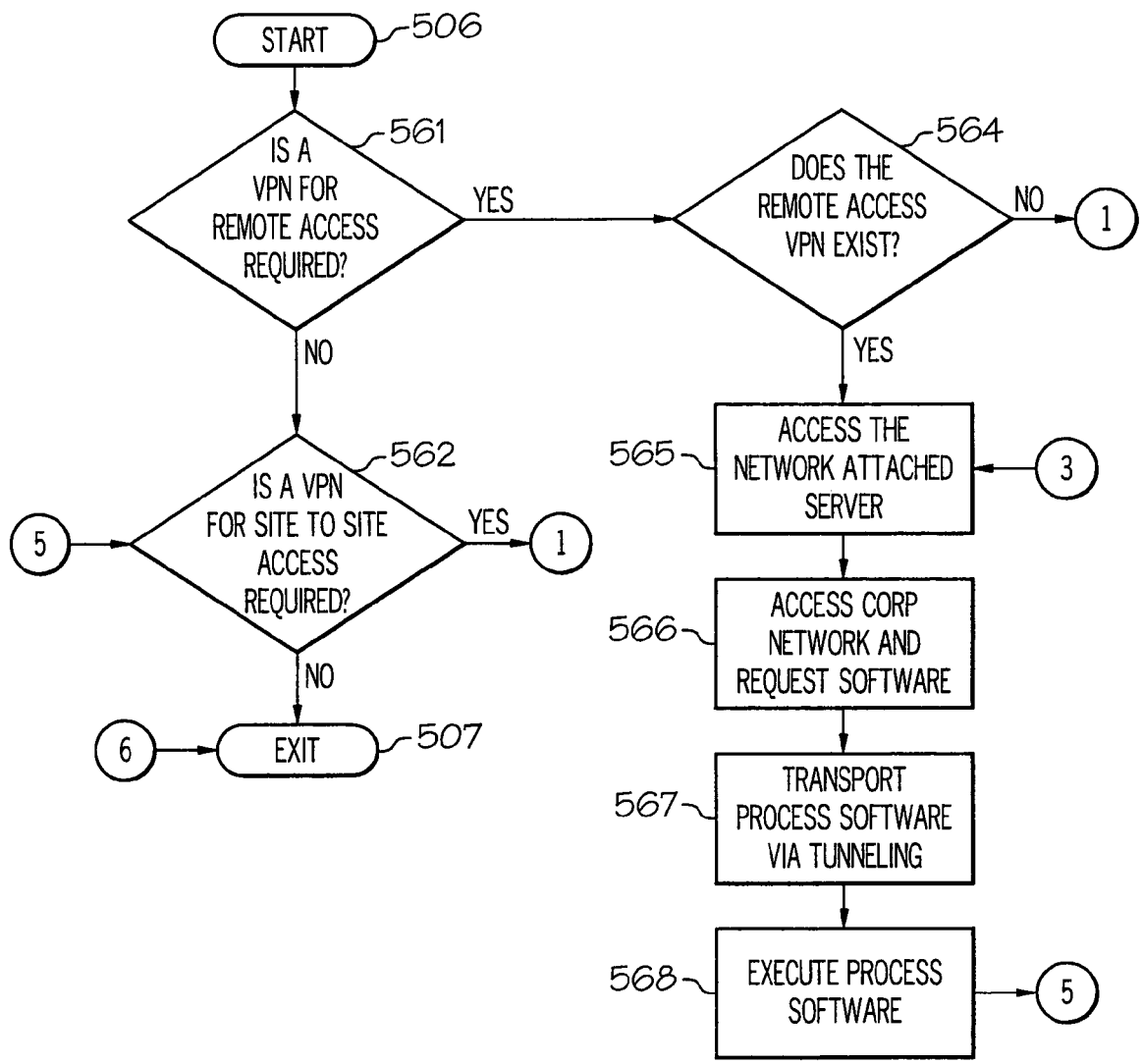
FIGS. 5A-C show a flow-chart of steps taken to deploy in a Virtual Private Network (VPN) software that is capable of executing the steps shown and described in FIGS. 3A-3C.
Figure 5B:
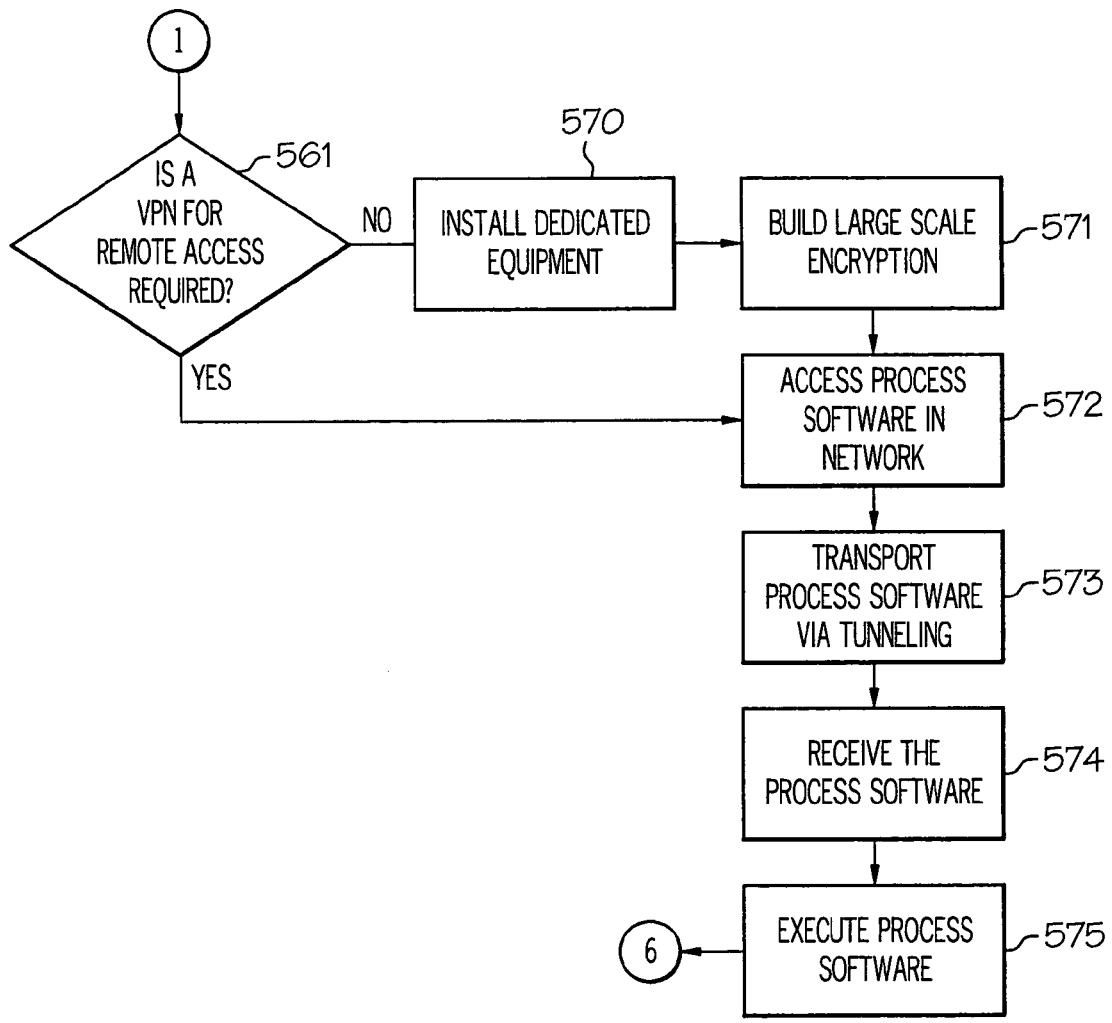
Figure 5C:
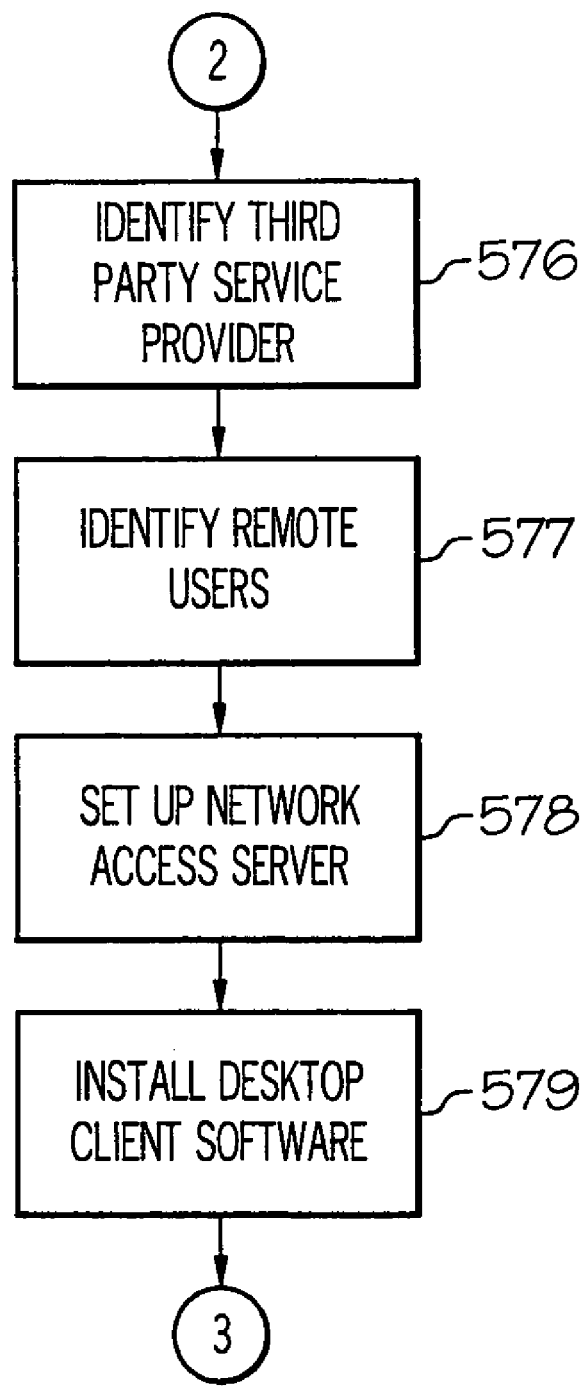

The process for such VPN deployment is described in FIG. 5. Initiator block 506 begins the Virtual Private Network (VPN) process. A determination is made to see if a VPN for remote access is required (query block 561). If it is not required, then proceed to (query block 562). If it is required, then determine if the remote access VPN exists (query block 564).

If a VPN does exist, then proceed to block 565. Otherwise identify a third party provider that will provide the secure, encrypted connections between the company's private network and the company's remote users (block 576). The company's remote users are identified (block 577). The third party provider then sets up a network access server (NAS) (block 578) that allows the remote users to dial a toll free number or attach directly via a broadband modem to access, download and install the desktop client software for the remote-access VPN (block 579).

After the remote access VPN has been built or if it been previously installed, the remote users can access the process software by dialing into the NAS or attaching directly via a cable or DSL modem into the NAS (block 565). This allows entry into the corporate network where the process software is accessed (block 566). The process software is transported to the remote user's desktop over the network via tunneling (block 567). That is, the process software is divided into packets and each packet including the data and protocol is placed within another packet (block 567). When the process software arrives at the remote user's desk-top, it is removed from the packets, reconstituted and then is executed on the remote user's desk-top (block 568).

A determination is then made to see if a VPN for site to site access is required (query block 562). If it is not required, then proceed to exit the process (terminator block 507). Otherwise, determine if the site to site VPN exists (query block 561). If it does exist, then proceed to block 572. Otherwise, install the dedicated equipment required to establish a site to site VPN (block 570). Then build the large scale encryption into the VPN (block 571).

After the site to site VPN has been built or if it had been previously established, the users access the process software via the VPN (block 572). The process software is transported to the site users over the network via tunneling (block 573). That is the process software is divided into packets and each packet including the data and protocol is placed within another packet (block 574). When the process software arrives at the remote user's desktop, it is removed from the packets, reconstituted and is executed on the site user's desktop (block 575). The process then ends at terminator block 507.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6A:
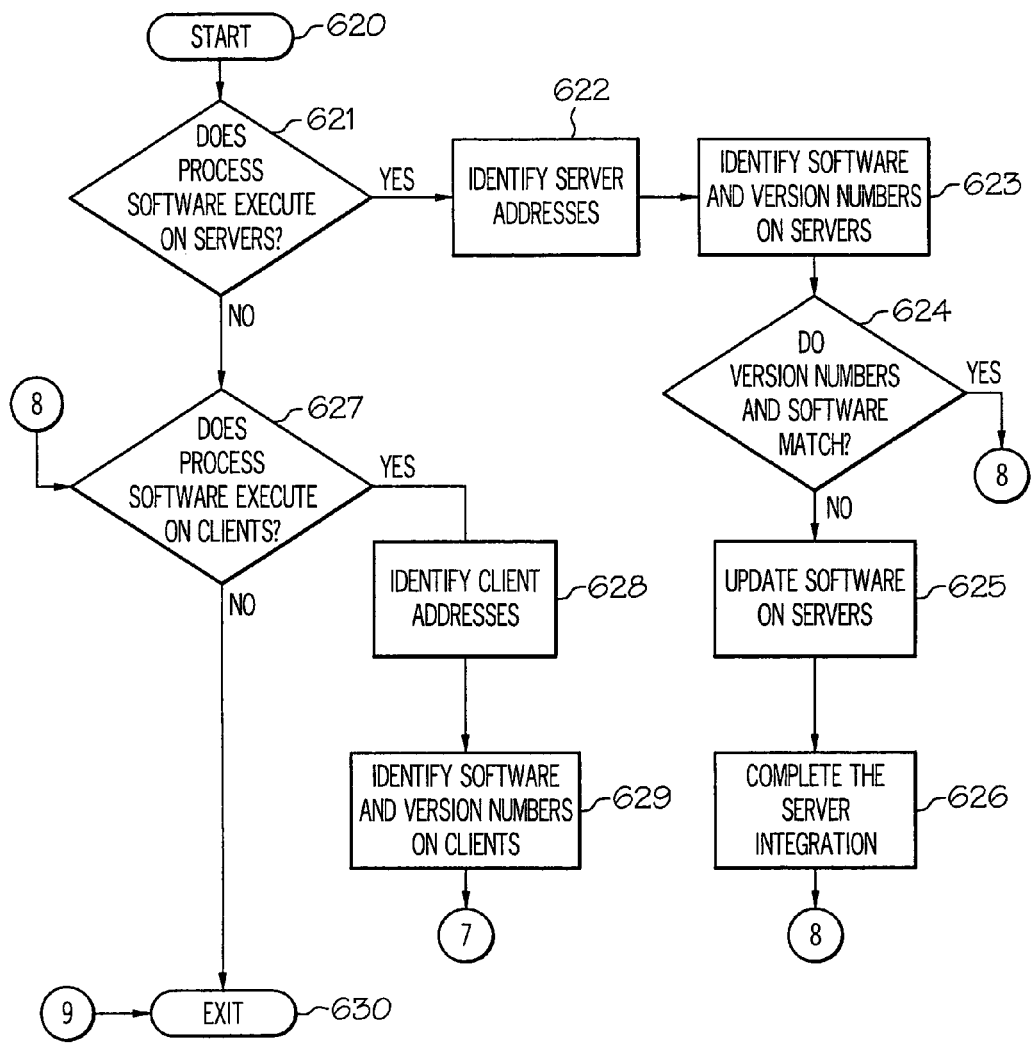
FIGS. 6A-B show a flow-chart showing steps taken to integrate into a computer system software that is capable of executing the steps shown and described in FIGS. 3A-3C.
Figure 6B:
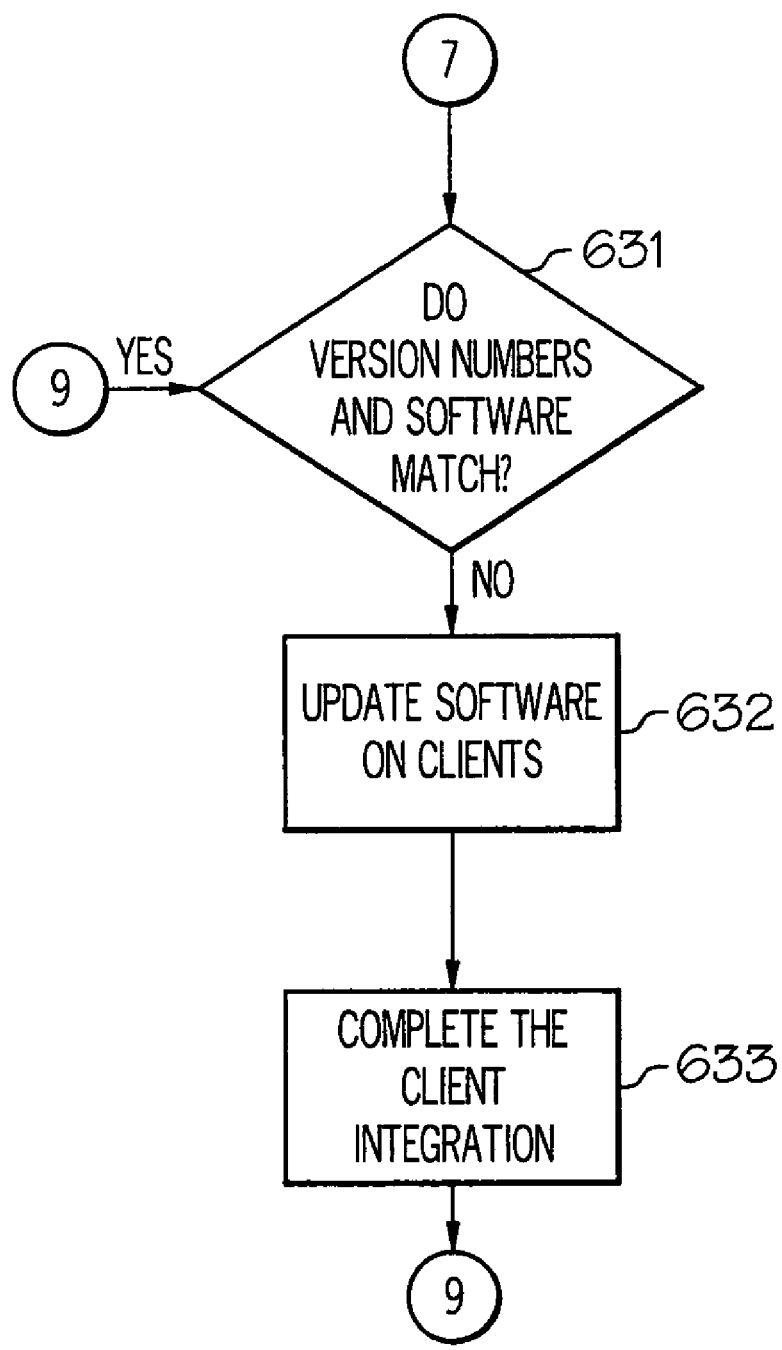

For a high-level description of this process, reference is now made to FIG. 6. Initiator block 620 begins the integration of the process software. The first tiling is to determine if there are any process software programs that will execute on a server or servers (block 621). If this is not the case, then integration proceeds to query block 627. If this is the case, then the server addresses are identified (block 622). The servers are checked to see if they contain software that includes the operating system (OS), applications, and network operating systems (NOS), together with their version numbers, which have been tested with the process software (block 623). The servers are also checked to determine if there is any missing software that is required by the process software in block 610.

A determination is made if the version numbers match the version numbers of OS, applications and NOS that have been tested with the process software (block 624). If all of the versions match and there is no missing required software the integration continues in query block 627.

If one or more of the version numbers do not match, then the unmatched versions are updated on the server or servers with the correct versions (block 625). Additionally, if there is missing required software, then it is updated on the server or servers in the step shown in block 614. The server integration is completed by installing the process software (block 626).

The step shown in query block 627, which follows either the steps shown in block 621, 624 or 626 determines if there are any programs of the process software that will execute on the clients. If no process software programs execute on the clients the integration proceeds to terminator block 630 and exits. If this not the case, then the client addresses are identified as shown in block 628.

The clients are checked to see if they contain software that includes the operating system (OS), applications, and network operating systems (NOS), together with their version numbers, which have been tested with the process software (block 629). The clients are also checked to determine if there is any missing software that is required by the process software in the step described by block 622.

A determination is made is the version numbers match the version numbers of OS, applications and NOS that have been tested with the process software (query block 631). If all of the versions match and there is no missing required software, then the integration proceeds to terminator block 630 and exits.

If one or more of the version numbers do not match, then the unmatched versions are updated on the clients with the correct versions (block 632). In addition, if there is missing required software then it is updated on the clients (also block 626). The client integration is completed by installing the process software on the clients (block 633). The integration proceeds to terminator block 630 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
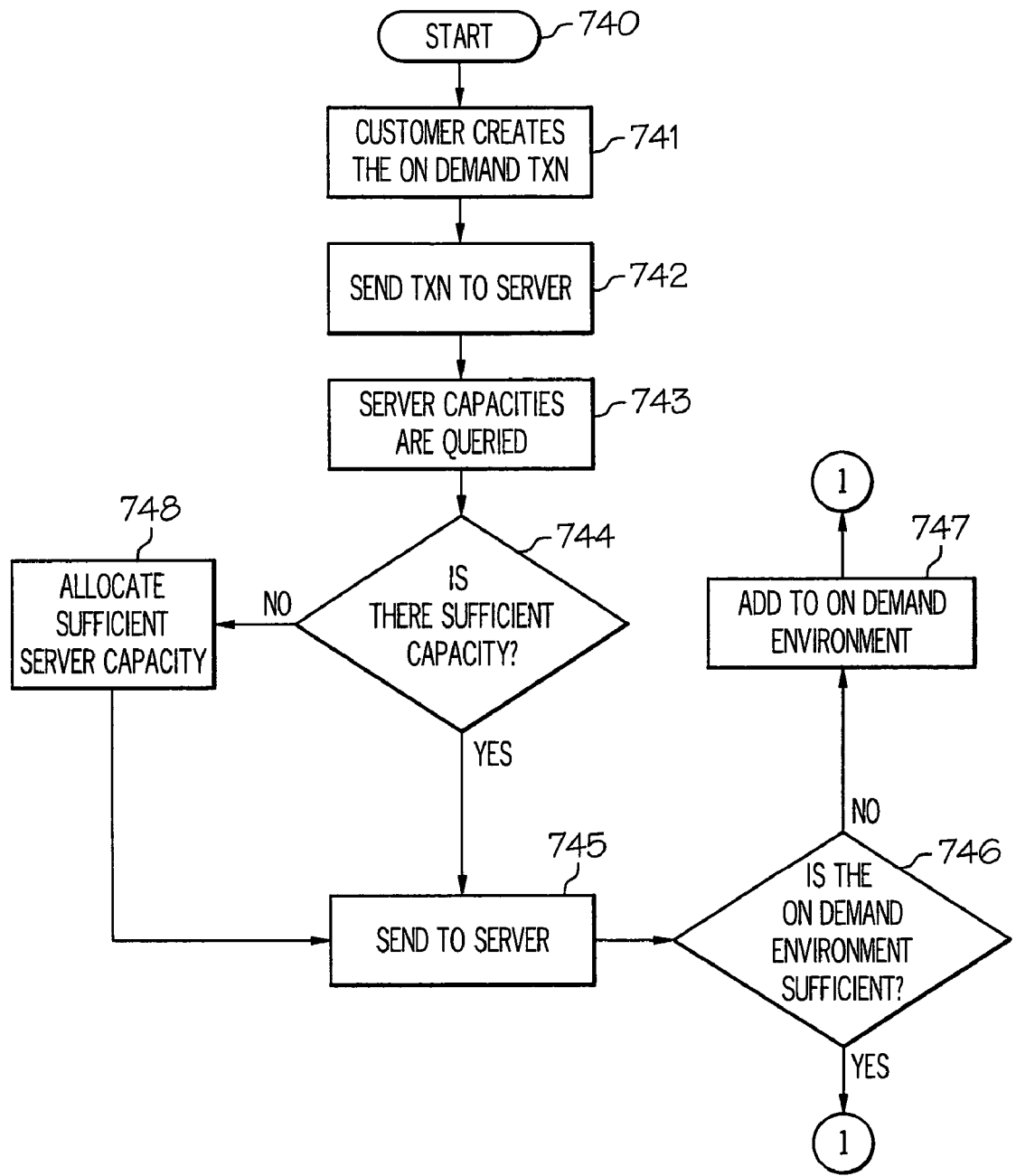
FIGS. 7A-B show a flow-chart showing steps taken to execute the steps shown and described in FIGS. 3A-3C using an on-demand service provider.
Figure 7B:
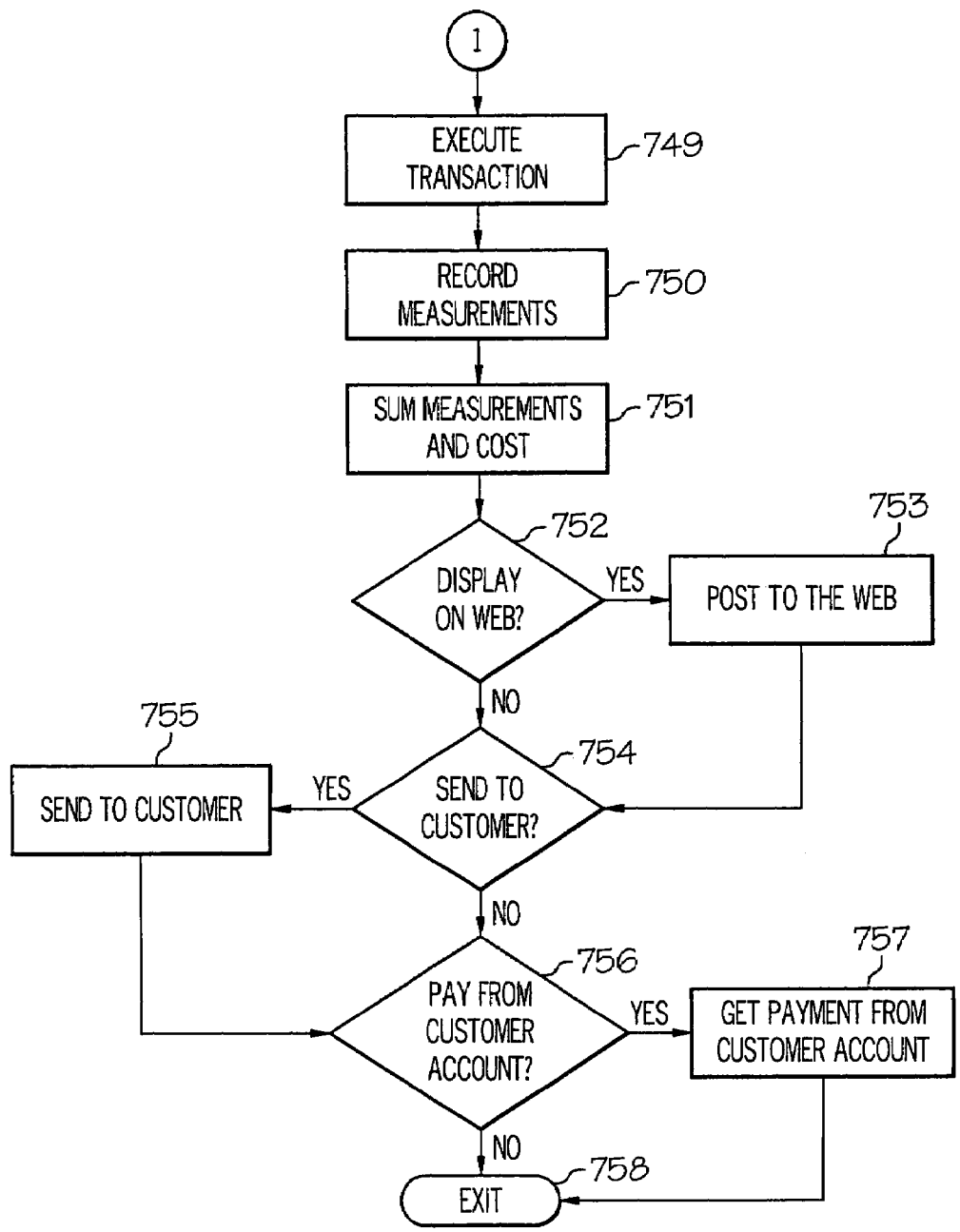

With reference now to FIG. 7, initiator block 740 begins the On Demand process. A transaction is created than contains the unique customer identification, the requested service type and any service parameters that further, specify the type of service (block 741). The transaction is then sent to the main server (block 742). In an On Demand environment the main server can initially be the only server, then as capacity is consumed other servers are added to the On Demand environment.

The server central processing unit (CPU) capacities in the On Demand environment are queried (block 743). The CPU requirement of the transaction is estimated, then the servers available CPU capacity in the On Demand environment are compared to the transaction CPU requirement to see if there is sufficient CPU available capacity in any server to process the transaction (query block 744). If there is not sufficient server CPU available capacity, then additional server CPU capacity is allocated to process the transaction (block 748). If there was already sufficient Available CPU capacity then the transaction is sent to a selected server (block 745).

Before executing the transaction, a check is made of the remaining On Demand environment to determine if the environment has sufficient available capacity for processing the transaction. This environment capacity consists of such things as but not limited to network bandwidth, processor memory, storage etc. (block 746). If there is not sufficient available capacity, then capacity will be added to the On Demand environment (block 747). Next the required software to process the transaction is accessed, loaded into memory, then the transaction is executed (block 749).

The usage measurements are recorded (block 750). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 751).

If the customer has requested that the On Demand costs be posted to a web site (query block 752), then they are posted (block 753). If the customer has requested that the On Demand costs be sent via e-mail to a customer address (query block 754), then these costs are sent to the customer (block 755). If the customer has requested that the On Demand costs be paid directly from a customer account (query block 756), then payment is received directly from the customer account (block 757). The On Demand process is then exited at terminator block 758.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

What is claimed is:

1. A computer-implementable method comprising:
identifying a received message as a member of a message group;
dynamically selecting a single destination consumer application from among multiple possible destination consumer applications within a cluster application to which messages of the message group may be forwarded;
when at least a first message of the message group comprises a group count indicating a total number of members within the message group:
assigning a temporary storage location to the message group on receipt of the first member of the message group;
collecting each member of the message group within the storage location assigned to that message group, wherein only members of the message group are stored within that storage location;
tracking a number of received members stored within the storage location to determine when all members of the message group have been received;
enabling the forwarding of the message group to the destination consumer application only after all members of the message group have been received; and
automatically forwarding each member of the message group to only the single destination consumer application selected, once the single destination consumer application is selected to forward a first member of the message group to;
when the members are assigned a sequence value within their headers corresponding to a preferred order for forwarding the members to the destination consuming application, said collecting comprises mapping each received member of the message group to an in-sequence location of the storage location corresponding to the correct sequence value within the message header, wherein said automatically forwarding transfers said members of the message group in the sequence in which said members are stored within the storage location.

2. The method of claim 1, wherein said identifying comprises parsing a header of the received message for a group identifier (ID), wherein all messages that are members of a same message group contain a same group ID within their message header and a single message that is not a part of a message group contains a null value within the header field within which group ID is stored.

3. The method of claim 2, further comprising:
when the received message does not contain a group ID, immediately forwarding the message to a destination consumer application not currently assigned to a message group; and
when the received message does contain a group ID:
parsing a header of the received message for a group count value; and
when there is no group count value with the received message or the group count value is a null value, dynamically assigning the corresponding message group with the group ID to a particular destination consumer application and immediately forwarding said received message and each subsequent message received with the same group ID to that particular consumer application.

4. The method of claim 2 further comprising:
comparing the group ID with existing group IDs associated with message groups being stored in temporary storage locations; and
when the group ID matches one of the existing group IDs, storing said message within the storage location associated with the existing group ID that matches the group ID.

5. The method of claim 3, wherein, when the received message is not a member of a message group, said method further comprises:
determining which consumer application of the multiple consumer applications within the application cluster are not currently assigned to a message group;
blocking access to any destination consumer application currently assigned to a message group for forwarding the members of the message group;
forwarding the received message to only an consumer application that is not currently assigned to a message group; and
when all destination consumer application have been assigned to a message group, holding the received message until one of the destination consumer applications is released from the assignment to a message group and becomes available.

6. A system comprising:
a processor;
a data bus coupled to the processor;
a memory coupled to the data bus; and
a computer-usable medium embodying computer program code, the computer program code comprising instructions executable by the processor and configured to:
parse a header of the received message for a group identifier (ID), wherein all messages that are members of a same message group contain a same group ID within their message header and a single message that is not a part of a message group contains a null value within the header field within which group ID is stored;
identify a received message as a member of a message group;
dynamically select a single destination consumer application from among multiple possible destination consumer applications within a cluster application to which messages of the message group may be forwarded; and
automatically forward each member of the message group to the single destination consumer application selected;
when the received message does contain a group ID:
parse a header of the received message for a group count value; and
when there is no group count value with the received message or the group count value is a null value, dynamically assign the corresponding message group with the group ID to a particular destination consumer application and immediately forward said received message and each subsequent message received with the same group ID to that particular consumer application;
when the received message does not contain a group ID, initiate a forwarding of the message to a destination consumer application not currently assigned to a message group; and
when the received message is not a member of a message group:
determine which consumer application of the multiple consumer applications within the application cluster are not currently assigned to a message group;
block access to any destination consumer application assigned to a message group for forwarding the members of the message group;
forward the received message to only an consumer application that is not currently assigned to a message group; and
when all destination consumer application are currently assigned to a message group, hold the received message until one of the destination consumer applications is released from the assignment to a message group and becomes available.

7. The system of claim 6, wherein when at least a first message of the message group comprises a group count indicating a total number of members within the message group, wherein the instructions are further configured to:
assign a temporary storage location to the message group on receipt of the first member of the message group;
collect each member of the message group within the storage location assigned to that message group, wherein only members of the message group are stored within that storage location;
track a number of received members stored within the storage location to determine when all members of the message group have been received;
enable the forwarding of the message group to the destination consumer application only after all members of the message group have been received; and
wherein, when the members are assigned a sequence value within their headers corresponding to a preferred order for forwarding the members to the destination consuming application, said instructions configured to collect are further configured to map each received member of the message group to an in-sequence location of the storage location corresponding to the correct sequence value within the message header, wherein said forwarding transfers said members of the message group in the sequence in which said members are stored within the storage location.

8. The system of claim 6, wherein the instructions are further configured to:
compare the group ID with existing group IDs associated with message groups being stored in temporary storage locations; and
when the group ID matches one of the existing group IDs, store said message within the storage location associated with the existing group ID that matches the group ID.

* * * * *